June 12, 1962 P. SCHMUCK 3,038,371
MOTION PICTURE CAMERA
Filed Sept. 4, 1959 2 Sheets-Sheet 1
Fig. 1
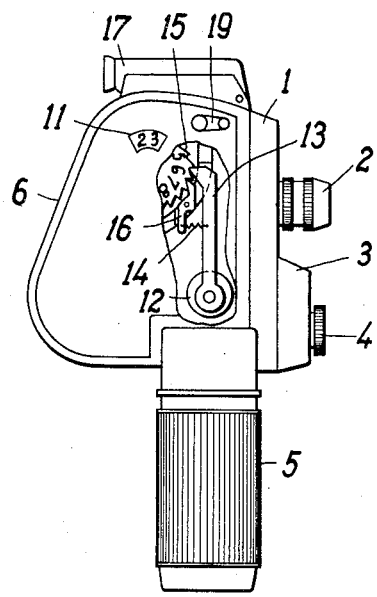
Fig. 2
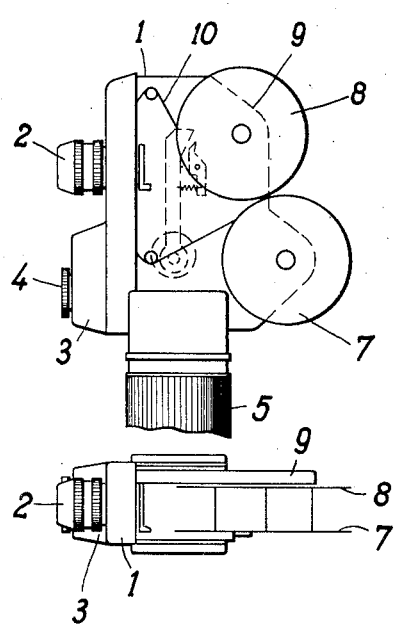
Fig. 4
Fig. 3
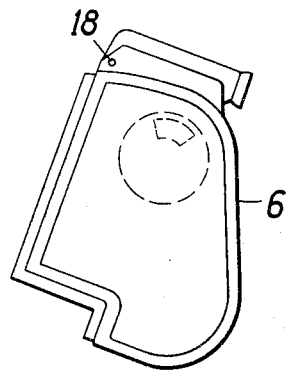
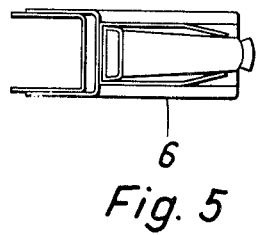
Fig. 5
Inventor:
Peter Schmuck June 12, 1962    P. SCHMUCK    3,038,371
MOTION PICTURE CAMERA Filed Sept. 4, 1959    2 Sheets-Sheet 2

Inventor:

United States Patent Office 3,038,371
Patented June 12, 1962

3,038,371
MOTION PICTURE CAMERA
Peter Schmuck, Mauren, Liechtenstein, assignor to
Kamerabau-Anstalt, Vaduz, Liechtenstein
Filed Sept. 4, 1959, Ser. No. 838,138
4 Claims. (Cl. 88—17)

Various possibilities exist to introduce reels into and to remove them from a motion picture camera without touching the film. The best known method resides in gripping the rim of the reel flanging facing the operator of the camera. If the balls of the finger or thumb are used for this purpose the disadvantage results that further ball parts may touch the fully wound film. This is undesirable. There is also the danger that sharp edges of the reel cover flanges may penetrate the skin. For this reason the reels can be gripped more carefully by clamping the rim of the reel between the fingers and fingernails. This is inconvenient, however, because the rim edges of the reel will penetrate the sensitive nail bed. Other possibilities have not existed in such motion picture cameras of previous construction. In addition to the previously usual provision of a window in the housing, the housing has already been provided with hinged side walls or designed to be entirely pulled off but the camera wall which carried the reels was always so arranged that a replacement of reels was only possible by a manipulation as described hereinbefore.

For this reason it is desirable to provide a construction of the camera or of the housing thereof which permits of a lateral gripping of the reels without touching the film and in such a manner that the rim of the reel not to be gripped.

The construction of a miniature motion picture camera according to the invention solves this problem. Comprising a housing cap which can be pushed on and pulled from the camera body it is characterized in that the reel carrier plate is offset relative to the rims of the side flanges of the reels, with the exception of a part required for carrying the reel shafts and for driving the reels, so that the reel flanges can be gripped from both sides.

The drawing shows an illustrative embodiment of the invention in the example of a camera in which the spring drive is accommodated in a sticklike handle of the camera.

FIG. 1 is a side elevation showing a camera constructed according to the invention.

FIG. 2 is a top plan view showing the camera body after the housing cap has been removed.

FIG. 3 is a side elevation showing the housing cap.

FIG. 4 is a top plan view showing the camera body after the housing cap has been removed in the direction from top to bottom.

FIG. 5 is a top plan view showing the pulled-off housing cap in the same direction.

Figure 6:
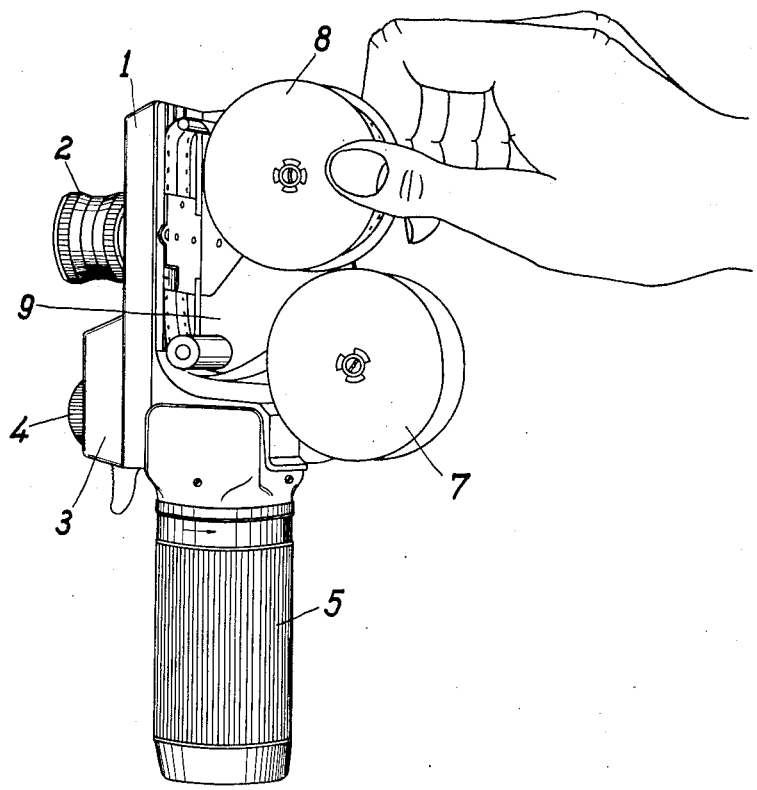
FIG. 6 is a perspective view showing how the reels can be replaced by a lateral gripping thereof at the circular boundary surfaces.

In the figures, 1 is the camera body with the lens 2. 3 is the transmission and 4 is the setting knob for the stop or locked position of the transmission, the various transmission speeds and for stills and self-photographs. 5 is the sticklike handle of the camera, in which the spring mechanism for driving the transmission 3 is accommodated. The drive spring is tensioned by turning the handle 5.

A housing cap 6 is pushed on the camera body 1 in FIG. 1 and can be separated from the camera body 1, as is shown in FIGS. 2 and 3, to expose the film supply and take-up reels 7, 8.

FIG. 2 shows clearly that by this separability the two film reels 7, 8 are entirely exposed on their front side facing the viewer. The offset wall 9 exposes, above all, large portions of the circular disc-shaped boundary walls of the reels and their rear surface as far as the essential means for holding the film reels precludes such access. For this reason the exchange of reels or the inserting or removal of the film 10 do not involve the least difficulty.

In order to indicate at 11 the film length which has already been unwound the transmission, which is accommodated in the transmission housing 3 and not shown in detail, has an eccentric disc 12, which moves a drive pawl 13. This drive pawl 13 is spring-loaded at 14 and engages a ratchet wheel 15 which is mounted in the housing 6 for rotation against the action of a spring. There is further a spring-loaded locking pawl 16, which prevents a backward rotation of the ratchet wheel 15, which would result from the action of the tensioned spring unless the locking pawl 16 was provided. If the housing cap 6 with the ratchet wheel 15 is pushed on the camera body 1, the drive pawl 13 will enter a tooth space of the ratchet wheel if it registers with such space so that the drive pawl 13 and the ratchet wheel are thus coupled. On the other hand, if the drive pawl meets just a tooth of the ratchet wheel 15 when the housing cap 6 is being pushed on, the drive pawl will first yield resiliently. When the transmission is then started the feed pawl will enter the next tooth space and from this time on will advance the indicator 11 by means of the ratchet wheel 15 in the usual manner. The locking pawl 16 behaves similarly so that the coupling and uncoupling during the fitting and removal of the housing cap 6 do not involve the least difficulty. However, the spring of the ratchet wheel 15 will relax when the housing cap 6 is pulled from the camera body 1. This spring has been tensioned during the forward movement of the ratchet wheel. As a result of the relaxation of the spring, the indicator 11 will automatically return to zero whenever the housing cap 6 is removed. The housing cap 6 may carry a viewfinder 17, which is rotatable on the axis 18 for parallax compensation. A locking device 19 retains the housing cap 6 in position on the camera body 1.

What is claimed is:

1. In a spool-loaded motion picture camera, in combination, support means for supporting various camera components including at the front of said support means the objective of the camera, said support means including a wall extending rearwardly from said front of said support means and terminating in a rear edge; and a pair of reel-supporting shafts for respectively supporting supply and take-up reels, said shafts being carried by said wall adjacent to said rear edge thereof at a distance from said rear edge substantially less than the radii of said reels so that reels on said shafts, respectively, will extend rearwardly beyond said rear edge of said wall whereby the operator can hold said reels at their exterior side surfaces to place said reels on and remove them from said shafts.

2. In a spool-loaded motion picture camera, in combination, support means for supporting various camera components including at the front of said support means the objective of the camera, said support means including a wall extending rearwardly from said front of said support means and terminating in a rear edge; and a pair of reel-supporting shafts for respectively supporting supply and take-up reels, said shafts being carried by said wall adjacent to said rear edge thereof at a distance from said rear edge substantially less than the radii of said reels so that reels on said shafts, respectively, will extend rearwardly beyond said rear edge of said wall whereby the operator can hold said reels at their exterior side surfaces to place said reels on and remove them from said shafts; and a cover removably carried by said support means for enclosing said wall and reels in a light-tight manner, said cover including a pair of side walls between which said wall of said support means is located when said cover is carried by said support means.

3. In a spool-loaded motion picture camera, in combination, support means for supporting various camera components including at the front of said support means the objective of the camera, said support means including a wall extending rearwardly from said front of said support means and terminating in a rear edge; a pair of reel-supporting shafts for respectively supporting supply and take-up reels, said shafts being carried by said wall at one side thereof adjacent to said rear edge thereof at a distance from said rear edge substantially less than the radii of said reels so that reels on said shafts, respectively, will extend rearwardly beyond said rear edge of said wall whereby the operator can hold said reels at their exterior side surfaces to place said reels on and remove them from said shafts; a cover removably carried by said support means for enclosing said wall and reels in a light-tight manner, said cover including a pair of walls between which said side wall of said support means is located when said cover is carried by said support means, one of said walls of said cover being formed with a window and being located at the side of said wall of said support means opposite from said shafts; a film-footage counter disc turnably carried by said one cover wall and having indicia visible through said window, said disc having ratchet teeth at its periphery; drive means carried by said support means and including a rotary member; and a pawl pivotally connected to said rotary member at a point spaced from the turning axis thereof so that said pawl is eccentrically connected with said rotary member to move through a predetermined stroke during rotation of said rotary member, said wall of said support means being located between said pawl and said shafts, and said pawl engaging said ratchet teeth of said disc for advancing the latter during operation of the camera, said ratchet teeth of said disc moving into operative relation with said pawl when said cover is placed on said support means.

4. In a spool-loaded motion picture camera, in combination, support means for supporting various camera components including at the front of said support means the objective of the camera, said support means including a wall extending rearwardly from said front of said support means and terminating in a rear edge; a pair of reel-supporting shafts for respectively supporting supply and take-up reels, said shafts being carried by said wall adjacent to said rear edge thereof at a distance from said rear edge substantially less than the radii of said reels so that reels on said shafts, respectively, will extend rearwardly beyond said rear edge of said wall whereby the operator can hold said reels at their exterior side surfaces to place said reels on and remove them from said shafts; a cover removably carried by said support means for enclosing said wall and reels in a light-tight manner, said cover including a pair of walls between which said side wall of said support means is located when said cover is carried by said support means; and viewfinder means carried by said cover at an upper portion thereof.

References Cited in the file of this patent

UNITED STATES PATENTS

| | | |
|---|---|---|
| 1,253,285 | Selig | Jan. 15, 1918 |
| 1,779,468 | Goldberg et al. | Oct. 28, 1930 |
| 1,892,412 | Steiner | Dec. 27, 1932 |
| 2,029,415 | Dennis | Feb. 4, 1936 |
| 2,166,147 | Heinisch et al. | July 18, 1939 |
| 2,191,027 | Ort | Feb. 20, 1940 |
| 2,238,482 | Wittel | Apr. 15, 1941 |
| 2,464,673 | Debrie | Mar. 15, 1949 |
| 2,573,994 | Shepard | Nov. 6, 1951 |
| 2,928,315 | Broido | Mar. 15, 1960 |
| 2,979,985 | Bolsey | Apr. 18, 1961 |